US012664437B2

(12) United States Patent
Wang et al.

(10) Patent No.: US 12,664,437 B2
(45) Date of Patent: Jun. 23, 2026

(54) SYSTEMS AND METHODS FOR MULTI-PURPOSE DATA MANAGEMENT

(71) Applicant: Recruit Co., Ltd., Tokyo (JP)

(72) Inventors: Runhui Wang, Mountain View, CA (US); Yuliang Li, Mountain View, CA (US); Jin Wang, Mountain View, CA (US)

(73) Assignee: Recruit Co., Ltd., Tokyo (JP)

( * ) Notice: Subject to any disclaimer, the term of this patent is extended or adjusted under 35 U.S.C. 154(b) by 596 days.

(21) Appl. No.: 18/305,657

(22) Filed: Apr. 24, 2023

(65) Prior Publication Data

US 2024/0289629 A1     Aug. 29, 2024

Related U.S. Application Data

(60) Provisional application No. 63/487,249, filed on Feb. 27, 2023.

(51) Int. Cl.
| | |
|---|---|
| *G06N 3/09* | (2023.01) |
| *G06F 16/28* | (2019.01) |
| *G06N 3/045* | (2023.01) |
| *G06N 3/0464* | (2023.01) |

(52) U.S. Cl.
CPC ............. *G06N 3/09* (2023.01); *G06F 16/285* (2019.01); *G06N 3/045* (2023.01); *G06N 3/0464* (2023.01)

(58) Field of Classification Search
CPC ........ G06N 3/09; G06N 3/045; G06N 3/0464; G06N 3/08; G06F 16/285
See application file for complete search history.

(56) References Cited

U.S. PATENT DOCUMENTS

| | | | |
|---|---|---|---|
| 11,423,072 B1 * | 8/2022 | Chen ..................... | G06F 18/253 |
| 2018/0089300 A1 * | 3/2018 | Ahuja ................... | G06F 16/215 |
| 2021/0224237 A1 * | 7/2021 | Faruquie ............... | G06F 16/285 |

(Continued)

OTHER PUBLICATIONS

Abedjan et al., "Temporal Rules Discovery for Web Data Cleaning," VLDB Endowment, vol. 9, No. 4, 2015 VLDB Endowment, Dec. 2015, 2150-8097/15/12. (13 pages).

(Continued)

*Primary Examiner* — Asher D Kells
(74) *Attorney, Agent, or Firm* — Finnegan, Henderson, Farabow, Garrett & Dunner, LLP

(57) ABSTRACT

Disclosed embodiments relate to data management of entity pairs. Techniques can include receiving at least two sets of data and a data management task request with each including a set of entities. Techniques can determine a location of each entity in received data sets in a representative space by determining representative structure of the set of entities. Techniques can then for an entity, a set of representative entity pairs from each set of the at least two sets of data based on how close they are in the representative space. Technique can then analyze the set of representative entity pairs to identify most similar entity pairs include in a set of candidate pairs by determining closeness of location of entities in each entity pair in the representative space. Technique can then determine matched entity pairs of the candidate pairs using a first machine learning model is trained using the candidate pairs by applying labels, and utilizing the matched pairs to perform the requested data management task.

20 Claims, 8 Drawing Sheets

(56) References Cited

U.S. PATENT DOCUMENTS

| | | | |
|---|---|---|---|
| 2021/0224602 A1* | 7/2021 | Nori | G06F 18/2415 |
| 2023/0061746 A1* | 3/2023 | Wei | G06F 16/288 |
| 2024/0045890 A1* | 2/2024 | Nguyen | G06Q 40/02 |

OTHER PUBLICATIONS

Akiba et al., "Optuna: A Next-generation Hyperparameter Optimization Framework," Preprint, compiled Jul. 26, 2019, arXiv:1907.10902v1 [cs.LG] Jul. 25, 2019 (10 pages).

Berrar and Dubitsky, "Deep learning in bioinformatics and biomedicine," Briefings in Bioinformatics, 22(2), 2021, 1513-1514, Advance Access Publication Date: Mar. 10, 2021 (2 pages).

Bohannon et al., "A Cost-Based Model and Effective Heuristic for Repairing Constraints by Value Modification," SIGMOD 2005 Jun. 1416, 2005, Baltimore, Maryland, USA., Copyright 2005 ACM 159593060-4/05/06 (12 pages).

Brunner and Stockinger, "Entity Matching with Transformer Architectures—A Step Forward in Data Integration," Published in Proceedings of the 23rd International Conference on Extending Database Technology (EDBT), Mar. 30-Apr. 2, 2020, ISBN 978-3-89318-083-7 on OpenProceedings.org (11 pages).

Cafarella et al., "WebTables: Exploring the Power of Tables on the Web," PVLDB '08, Aug. 23-28, 2008, Auckland, New Zealand, Copyright 2008 VLDB Endowment, ACM 978-1-60558-305-1/08/08 (12 pages).

Chen et al., "BigGorilla: An Open-Source Ecosystem for Data Preparation and Integration," Bulletin of the IEEE Computer Society Technical Committee on Data Engineering (12 pages).

Chen et al., "A Simple Framework for Contrastive Learning of Visual Representations," Proceedings of the 37th International Conference on Machine Learning, Vienna, Austria, PMLR 119, 2020 (11 pages).

Chen et al., "Improved Baselines with Momentum Contrastive Learning," arXiv:2003.04297v1 [cs.CV] Mar. 9, 2020 (3 pages).

Chen et al., "Big Self-Supervised Models are Strong Semi-Supervised Learners," 34th Conference on Neural Information Processing Systems (NeurIPS 2020), Vancouver, Canada (13 pages).

Chu et al., "Data Cleaning: Overview and Emerging Challenges," SIGMOD'16, Jun. 26-Jul. 1, 2016, San Francisco, CA, USA, c 2016 ACM. ISBN 978-1-4503-3531-7/16/06 (6 pages).

Das et al., "Falcon: Scaling up Hands-Off Crowdsourced Entity Matching to Build Cloud Services," SIGMOD'17, May 14-19, 2017, Chicago, Illinois, USA, c 2017 ACM. ISBN 978-1-4503-4197-4/17/05 (16 pages).

Deng et al., "TURL: Table Understanding through Representation Learning," arXiv:2006.14806v2 [cs.IR] Dec. 3, 2020, Proceedings of the VLDB Endowment, vol. 14, No. 3 ISSN 2150-8097 (14 pages).

Devlin et al., "BERT: Pre-training of Deep Bidirectional Transformers for Language Understanding," Proceedings of NAACL-HLT 2019, pp. 4171-4186, Minneapolis, Minnesota, Jun. 2-Jun. 7, 2019 (16 pages).

Dong and Rekatsinas, "Data Integration and Machine Learning: A Natural Synergy," Tutorials, SIGMOD'18, Jun. 10-15, 2018, Houston, TX, USA (6 pages).

Ebraheem et al., "Distributed Representations of Tuples for Entity Resolution," Aug. 2018, Rio de Janeiro, Brazil, Proceedings of the VLDB Endowment, vol. 11, No. 11 (14 pages).

Echihabi, "High-Dimensional Vector Similarity Search: From Time Series to Deep Network Embeddings," Student Abstract, SIGMOD '20, Jun. 14-19, 2020, Portland, OR, USA (4 pages).

Fang et al., "CERT: Contrastive Self-supervised Learning for Language Understanding," arXiv:2005.12766v2 [cs.CL] Jun. 18, 2020 (16 pages).

Fu et al., "Hierarchical Matching Network for Heterogeneous Entity Resolution," Proceedings of the Twenty-Ninth International Joint Conference on Artificial Intelligence (IJCAI-20) (7 pages).

Gao et al., "SimCSE: Simple Contrastive Learning of Sentence Embeddings," arXiv:2104.08821v4 [cs.CL] May 18, 2022 (17 pages).

Getoor and Machanavajjhala, "Entity Resolution: Theory, Practice & Open Challenges," Proceedings of the VLDB Endowment, vol. 5, No. 12, Copyright 2012 VLDB Endowment 21508097/12/08 (2 pages).

Giorgi et al., "DeCLUTR: Deep Contrastive Learning for Unsupervised Textual Representations," arXiv:2006.03659v4 [cs.CL] May 27, 2021 (17 pages).

Gokhale et al., "Corleone: Hands-Off Crowdsourcing for Entity Matching," SIGMOD'14, Jun. 22-27, 2014, Snowbird, UT, USA, Copyright 2014 ACM 978-1-4503-2376-5/14/06 (12 pages).

Hameed and Naumann, "Data Preparation: A Survey of Commercial Tools," Article in ACM SIGMOD Record, Dec. 2020, DOI: 10.1145/3444831.3444835 (13 pages).

He et al., "Momentum Contrast for Unsupervised Visual Representation Learning," Facebook AI Research (FAIR) (10 pages).

Heidari et al., "HoloDetect: Few-Shot Learning for Error Detection," Research 8: Data Integration/Cleaning, SIGMOD '19, Jun. 30-Jul. 5, 2019, Amsterdam, Netherlands, © 2019 Association for Computing Machinery, ACM ISBN 978-1-4503-5643-5/19/06 (18 pages).

Hulsebos et al., "Sherlock: A Deep Learning Approach to Semantic Data Type Detection," arXiv:1905.10688v1 [cs.LG] May 25, 2019, © 2019 Copyright held by the owner/author(s). Publication rights licensed to ACM., ACM ISBN 978-1-4503-6201-6/19/08 (9 pages).

Kasai et al., "Low-resource Deep Entity Resolution with Transfer and Active Learning," arXiv:1906.08042v1 [cs.DB] Jun. 17, 2019 (11 pages).

Kolahi et al., "On Approximating Optimum Repairs for Functional Dependency Violations," ICDT 2009, Mar. 23-25, 2009, Saint Petersburg, Russia, Copyright 2009 ACM 978-1-60558-423-2/09/0003 (10 pages).

Konda et al., "Magellan: Toward Building Entity Matching Management Systems over Data Science Stacks," Proceedings of the VLDB Endowment, vol. 9, No. 13 Copyright 2016 VLDB Endowment 2150-8097/16/09 (4 pages).

Krishnan et al., "ActiveClean: Interactive Data Cleaning for Statistical Modeling," Proceedings of the VLDB Endowment, vol. 9, No. 12, Copyright 2016 VLDB Endowment 21508097/16/08 (12 pages).

Lehmberg et al., "A Large Public Corpus of Web Tables containing Time and Context Metadata," WWW'16 Companion, Apr. 11-15, 2016, Montréal, Québec, Canada, ACM 978-1-4503-4144-8/16/04 (2 pages).

Li et al., "Deep Entity Matching with Pre-Trained Language Models," arXiv:2004.00584v3 [cs.DB] Sep. 2, 2020, Proceedings of the VLDB Endowment, vol. 14, No. 1 ISSN 2150-8097 (15 pages).

Li et al., "Data Augmentation for ML-driven Data Preparation and Integration," Proceedings of the VLDB Endowment, vol. 14, No. 12 ISSN 2150-8097 (4 pages).

Li et al., "CleanML: A Study for Evaluating the Impact of Data Cleaning on ML Classification Tasks," arXiv:1904.09483v3 [cs.DB] Apr. 5, 2021 (13 pages).

Li et al., "Deep Entity Matching: Challenges and Opportunities," © 2021 Association for Computing Machinery, 1936-1955/2021/01-ART1 (17 pages).

Li et al., "Auto-FuzzyJoin: Auto-Program Fuzzy Similarity Joins Without Labeled Examples," arXiv:2103.04489v1 [cs.DB] Mar. 7, 2021, © 2021 Copyright held by the owner/author(s). Publication rights licensed to ACM, ACM ISBN 978-1-4503-8343-1/21/06 (16 pages).

Limaye et al., "Annotating and Searching Web Tables Using Entities, Types and Relationships," 2010, Singapore, Proceedings of the VLDB Endowment, vol. 3, No. 1, Copyright 2010 VLDB Endowment 21508097/10/09 (10 pages).

Liu et al., "RoBERTa: A Robustly Optimized BERT Pretraining Approach," arXiv:1907.11692 [cs.CL], Jul. 26, 2019 (15 pages).

Mohammad Mahdavi and Ziawasch Abedjan, "Baran: Effective Error Correction via a Unified Context Representation and Trans-fer Learning," Proceedings of the VLDB Endowment, vol. 13, No. 11 ISSN 21508097 (14 pages).

(56)      References Cited

OTHER PUBLICATIONS

Mohammad Mahdavi and Ziawasch Abedjan, "Semi-Supervised Data Cleaning with Raha and Baran," CIDR 2021. 11th Annual Conference on Innovative Data Systems Research (CIDR '21) Jan. 10-13, 2021, Chaminade, USA. (7 pages).

Mahdavi, et al., "Raha: A Configuration-Free Error Detection System," In 2019 International Conference on Management of Data (SIGMOD '19), Jun. 30-Jul. 5, 2019, Amsterdam, Netherlands. ACM, New York, NY, USA, 18 pages. https://doi.org/10.1145/3299869.3324956 (19 pages).

Miao et al., "Rotom: A Meta-Learned Data Augmentation Framework for Entity Matching, Data Cleaning, Text Classification, and Beyond," In Proceedings of the 2021 International Conference on Management of Data (SIGMOD '21), Jun. 20-25, 2021, Virtual Event, China. ACM, New York, NY, USA, https://doi.org/10.1145/3448016. 3457258 (14 pages).

Mudgal et al., "Deep Learning for Entity Matching: A Design Space Exploration [Technical Report]," SIGMOD'18, Jun. 10-15, 2018, Houston, TX, USA (18 pages).

Nie et al., "Deep Sequence-to-Sequence Entity Matching for Heterogeneous Entity Resolution," CIKM '19, Nov. 3-7, 2019, Beijing, China (10 pages).

Ota et al., "Data-Driven Domain Discovery for Structured Datasets," PVLDB, 13(7): 953-965, 2020. DOI: https://doi.org/10.14778/3384345.3384346 (13 pages).

Papadakis et al., "Blocking and Filtering Techniques for Entity Resolution: A Survey," ACM Computing Surveys, vol. 53, No. 2, Article 31. Publication date: Mar. 2020. (42 pages).

Paszke e al., "PyTorch: An Imperative Style, High-Performance Deep Learning Library," 3rd Conference on Neural Information Processing Systems (NeurIPS 2019), Vancouver, Canada. (12 pages).

Peeters and Bizer, "Dual-Objective Fine-Tuning of BERT for Entity Matching," PVLDB, 14(10): 1913-1921, 2021. doi:10.14778/3467861. 3467878 (9 pages).

Peeters et al., "Intermediate Training of BERT for Product Matching," DI2KG 2020, Aug. 31, 2020, Tokyo, Japan (5 pages).

Pierson and Gashler, "Deep Learning in Robotics: A Review of Recent Research," arXiv:1707.07217 [cs.RO] 2017 (41 pages).

Reimers and Gurevych , "Ubiquitous Knowledge Processing Lab (UKP-TUDA)," rXiv:1908.10084v1 [cs.CL} Aug. 27, 2019 (11 pages).

Rekatsinas et al., "HoloClean: Holistic Data Repairs with Probabilistic Inference," arXiv:1702.00820v1 [cs.DB] Feb. 2, 2017 (13 pages).

Ritze and Bizer, "Matching Web Tables to DBpedia—A Feature Utility Study," Published in Proc. 20th International Conference on Extending Database Technology (EDBT), Mar. 21-24, 2017—Venice, Italy: ISBN 978-3-89318-073-8 (12 pages).

Saeedi et al., "Using Link Features for Entity Clustering in Knowledge Graphs," University of Leipzig & ScaDS Dresden/Leipzig (15 pages).

Sanh et al., "DistilBERT, a distilled version of BERT: smaller, faster, cheaper and lighter," arXiv:1910.01108v4 [cs.CL] Mar. 1, 2020 (5 pages).

Shen et al., "A Simple but Tough-to-Beat Data Augmentation Approach for Natural Language Understanding and Generation," emarXiv:2009.13818v2 [cs.CL] Oct. 23, 2020 (10 pages).

Simonini et al., "BLAST: a Loosely Schema-aware Meta-blocking Approach for Entity Resolution," Proceedings of the VLDB Endowment, vol. 9, No. 12 Copyright 2016 VLDB Endowment 2150-8097/16/08 (12 pages).

Simonini et al., "Schema-agnostic Progressive Entity Resolution," atarXiv:1905.06385v1 [cs.DB] May 15, 2019 (14 pages).

Snipes, "Product Review Google Data Studio," Snipes, G. (2018). Google Data Studio [Product Review]. Journal of Librarianship and Scholarly Communication, 6(General Issue), eP2214. https://doi.org/10.7710/2162-3309.2214 (5 pages).

Socher et al., "Deep Learning for NLP (without Magic)," Tutorial Abstracts of ACL 2012, p. 5, Jeju, Republic of Korea, Jul. 8, 2012, c 2012 Association for Computational Linguistics (1 page).

Srivastava et al., "Dropout: A Simple Way to Prevent Neural Networks from Over fitting," Journal of Machine Learning Research 15 (2014) 1929-1958 Submitted Nov. 2013; Published Jun. 2014 (30 pages).

Sudowoodo_VLDB2022, "Sudowoodo: Contrastive Self-supervised Learning for Multi-purpose Data Integration and Preparation," arXiv:2207.04122v1 [cs.DB] Jul. 8, 2022 (19 pages).

Takeoka et al., "Meimei: An Efficient Probabilistic Approach for Semantically Annotating Tables," Copyright © 2019, Association for the Advancement of Artificial Intelligence (www.aaai.org) (8 pages).

Tang et al., "RPT: Relational Pre-trained Transformer Is Almost All You Need towards Democratizing Data Preparation," arXiv:2012.02469v2 [cs.LG] Mar. 31, 2021 (8 pages).

Thirumuruganathan et al., "Data Curation with Deep Learning," Published in Proceedings of the 23rd International Conference on Extending Database Technology (EDBT), Mar. 30-Apr. 2, 2020, ISBN 978-3-89318-083-7 on OpenProceedings.org. (10 pages).

Thirumuruganathan et al., "Deep Learning for Blocking in Entity Matching: A Design Space Exploration," Proceedings of the VLDB Endowment, vol. 14, No. 11 ISSN 2150-8097. doi: 10.14778/3476249.3476294 (14 pages).

Vaswani et al., "Attention Is All You Need," 31st Conference on Neural Information Processing Systems (NIPS 2017), Long Beach, CA, USA (11 pages).

Wang et al., "Database Meets Deep Learning: Challenges and Opportunities," arXiv:1906.08986v2 [cs.DB] Jan. 19, 2020 (10 pages).

Wang et al., "TCN: Table Convolutional Network forWeb Table Interpretation," arXiv:2102.09460v1 [cs.IR] Feb. 17, 2021, © 2021 IW3C2 (International World Wide Web Conference Committee), published under Creative Commons CC-BY 4.0 License, ACM ISBN 978-1-4503-8312-7/21/04 (12 pages).

Wolf et al., "Transformers: State-of-the-Art Natural Language Processing," Proceedings of the 2020 EMNLP (Systems Demonstrations), pp. 38-45 Nov. 16-20, 2020, c 2020 Association for Computational Linguistics (8 pages).

Wu et al., "ZeroER: Entity Resolution using Zero Labeled Examples," arXiv:1908.06049v2 [cs.DB] Apr. 6, 2020, SIGMOD'20, Jun. 14-19, 2020, Portland, OR, USA, © 2020 Association for Computing Machinery, ACM ISBN 978-1-4503-6735-6/20/06 (16 pages).

Zbontar et al., "Barlow Twins: Self-Supervised Learning via Redundancy Reduction," Proceedings of the 38th International Conference on Machine Learning, PMLR 139, 2021. Copyright 2021 by the author(s) (11 pages).

Zhang et al., "Sato: Contextual Semantic Type Detection in Tables," arXiv:1911.06311v3 [cs.DB] Jun. 3, 2020 (14 pages).

Zhang et al., "AutoBlock: A Hands-off Blocking Framework for Entity Matching," WSDM '20, Feb. 3-7, 2020, Houston, TX, USA, Association for Computing Machinery. https://doi.org/10.1145/3336191.3371813 (10 pages).

* cited by examiner

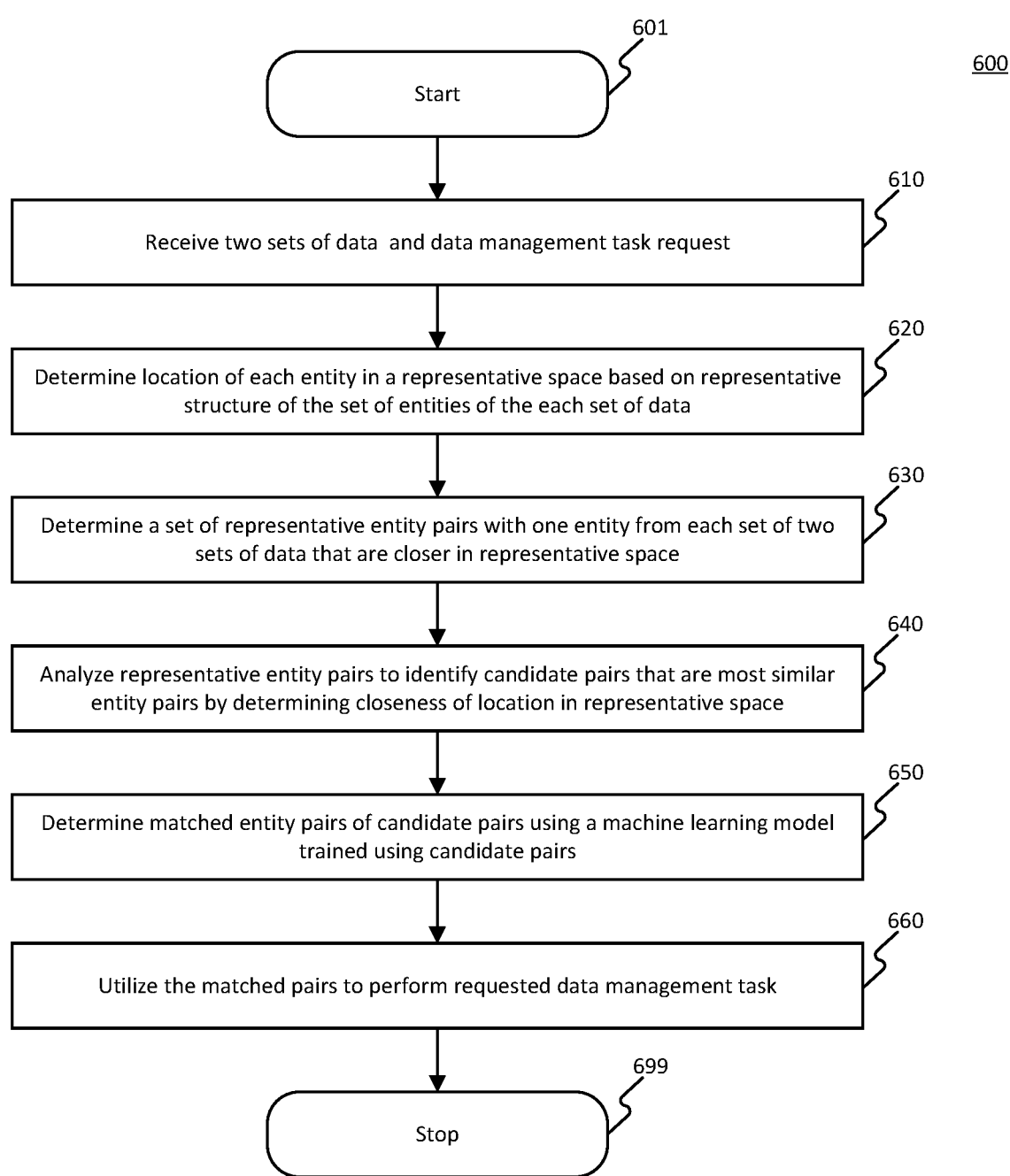

601

Start

600

610

Receive two sets of data and data management task request

620

Determine location of each entity in a representative space based on representative structure of the set of entities of the each set of data

630

Determine a set of representative entity pairs with one entity from each set of two sets of data that are closer in representative space

640

Analyze representative entity pairs to identify candidate pairs that are most similar entity pairs by determining closeness of location in representative space

650

Determine matched entity pairs of candidate pairs using a machine learning model trained using candidate pairs

660

Utilize the matched pairs to perform requested data management task

699

Stop

Fig. 6

SYSTEMS AND METHODS FOR MULTI-PURPOSE DATA MANAGEMENT

REFERENCE TO RELATED APPLICATIONS

This application claims priority to Provisional Application No. 63/487,249, which was filed on Feb. 27, 2023, and which is incorporated herein by reference in its entirety.

BACKGROUND

Natural language processing systems are used to understand information records to perform various tasks. Existing natural language processing systems can only perform a specific task and require a large labeled dataset as training data. Such custom systems performing a single task need to be adjusted regularly for changes in data format or sources of data. There is a need for techniques and systems for multi-purpose use with no manually labeled data preparation for different data management tasks. Such techniques and systems can respond to the needs of modern natural language systems in a timely and cost-effective manner.

SUMMARY

Certain embodiments of the present disclosure relate to a system for data management. The system includes one or more processors executing processor-executable instructions stored in one or more memory devices to perform a method. The method may include receive at least two sets of data and a data management task request, wherein each set of data includes a set of entities, determine a location of each entity of the set of entities of the each set of data in a representative space, wherein the location in the representative space is determined based on representative structure of the set of entities of the each set of data, determine, for an entity, a set of corresponding representative entity pairs from each set of the at least two sets of data, wherein entities in each of the set of representative entity pairs are determined to be closer in the representative space based on an angle between vector representation of entities in an entity pair of the representative entity pairs, analyze the set of representative entity pairs to identify a set of candidate pairs, wherein the candidate pairs include entity pairs of the representative entity pairs that are determined to be most similar entity pairs, wherein the most similar entity pairs are determined according to closeness of location in the representative space of entities in each entity pair of the set of representative entity pairs, determine matched entity pairs of the candidate pairs, wherein a first machine learning model is trained using the candidate pairs by applying label, and utilize the matched pairs to perform the requested data management task.

According to some disclosed embodiments, determining a location of each entity of the set of entities of the each set of data in a representative space may include pre-train a second model using a contrastive learning technique, wherein the contrastive learning includes a contrastive objective and takes as input the at least two sets of data, and determine representative structure of the each entity of the set of entities of the each set of data using the second model.

According to some disclosed embodiments, the second model is a convolution neural network.

According to some disclosed embodiments, representative entity pairs are determined to be closer in the representative space based on an angle between vector representation of entities in an entity pair of the representative entity pairs when the angle is more than a threshold value.

According to some disclosed embodiments, the candidate pairs are used to train a first machine learning model by applying labels to a subset of the set of representative entity pairs, wherein the subset of the set of representative entity pairs are entity pairs with similarity between encoded representations of each entity of the each entity pair is above a positive threshold value or below a negative threshold value.

According to some disclosed embodiments, applying labels to a subset of the set of representative entity pairs may include apply a positive value label to a first entity pair with entities that are determined to be closer to each other, wherein entities in the first entity pair are similar to each other, and apply a negative value label to a second entity pair with entities that are determined to be farther from each other, wherein entities in the second entity are dissimilar from each other.

According to some disclosed embodiments, applying a positive value label to a first entity pair with entities that are determined to be closer to each other may include varying amount of negative value depending on amount of distance between entities in the first entity pair.

According to some disclosed embodiments, applying a negative value label to a second entity pair with entities that are determined to be farther from each other may include varying amount of positive value depending on amount of distance between entities in the second entity pair.

According to some disclosed embodiments a data management task request includes one of: data integration, data cleanup, or data discovery.

According to some disclosed embodiments, determining matched entity pairs of the candidate pairs includes binary classification of entity pair as matched or unmatched.

According to some disclosed embodiments, determining matched entity pairs of the candidate pairs includes level of match between entities of each entity pair of the matched entity pairs.

According to some disclosed embodiments, pre-training a second model using a contrastive learning technique may include generate training data for the second model using an augmentation operator based on the requested data management task, wherein the augmentation operator generates variants of entities in the at least two sets of data, train the second model to determine similarity or dissimilarity between an entity of the at least two sets of the data and variant of the entity in the variants, wherein training the second model may include encode entity and the variant of the entity using a embedding model, and project encoded entity and the variant in a vector space.

According to some disclosed embodiments, the candidate pairs are used to train a first machine learning model that includes a linear layer based on the requested data management task.

Certain embodiments of the present disclosure relate to computer implemented method performing data management task on entities utilizing a data management system. The method may include receiving at least two sets of data and a data management task request, wherein each set of data includes a set of entities, determining a location of each entity of the set of entities of the each set of data in a representative space, wherein the location in the representative space is determined based on representative structure of the set of entities of the each set of data, determining, for an entity, a set of representative entity pairs from each set of the at least two sets of data, wherein entities in each of the set of representative entity pairs are determined to be closer in the representative space based on an angle between vector representation of entities in an entity pair of the representative entity pairs, analyzing the set of representative entity pairs to identify a set of candidate pairs, wherein the candidate pairs include entity pairs of the representative entity pairs that are determined to be most similar entity pairs, wherein the most similar entity pairs are determined according to closeness of location in the representative space of entities in each entity pair of the set of representative entity pairs, determining matched entity pairs of the candidate pairs, wherein a first machine learning model is trained using the candidate pairs by applying labels, and utilizing the matched pairs to perform the requested data management task.

Certain embodiments of the present disclosure relate to a non-transitory computer readable medium including instructions that are executable by one or more processors to cause a system to perform a method for performing data management task on entities. The method may include receiving at least two sets of data and a data management task request, wherein each set of data includes a set of entities, determining a location of each entity of the set of entities of the each set of data in a representative space, wherein the location in the representative space is determined based on representative structure of the set of entities of the each set of data, determining, for an entity, a set of representative entity pairs from each set of the at least two sets of data, wherein entities in each of the set of representative entity pairs are determined to be closer in the representative space based on an angle between vector representation of entities in an entity pair of the representative entity pairs, analyzing the set of representative entity pairs to identify a set of candidate pairs, wherein the candidate pairs include entity pairs of the representative entity pairs that are determined to be most similar entity pairs, wherein the most similar entity pairs are determined according to closeness of location in the representative space of entities in each entity pair of the set of representative entity pairs, determining matched entity pairs of the candidate pairs, wherein a first machine learning model is trained using the candidate pairs by applying labels, and utilizing the matched pairs to perform the requested data management task.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 6 is a flowchart showing an example method for data management using a multi-purpose data management system, consistent with embodiments of the present disclosure.

DETAILED DESCRIPTION

Figure 1:
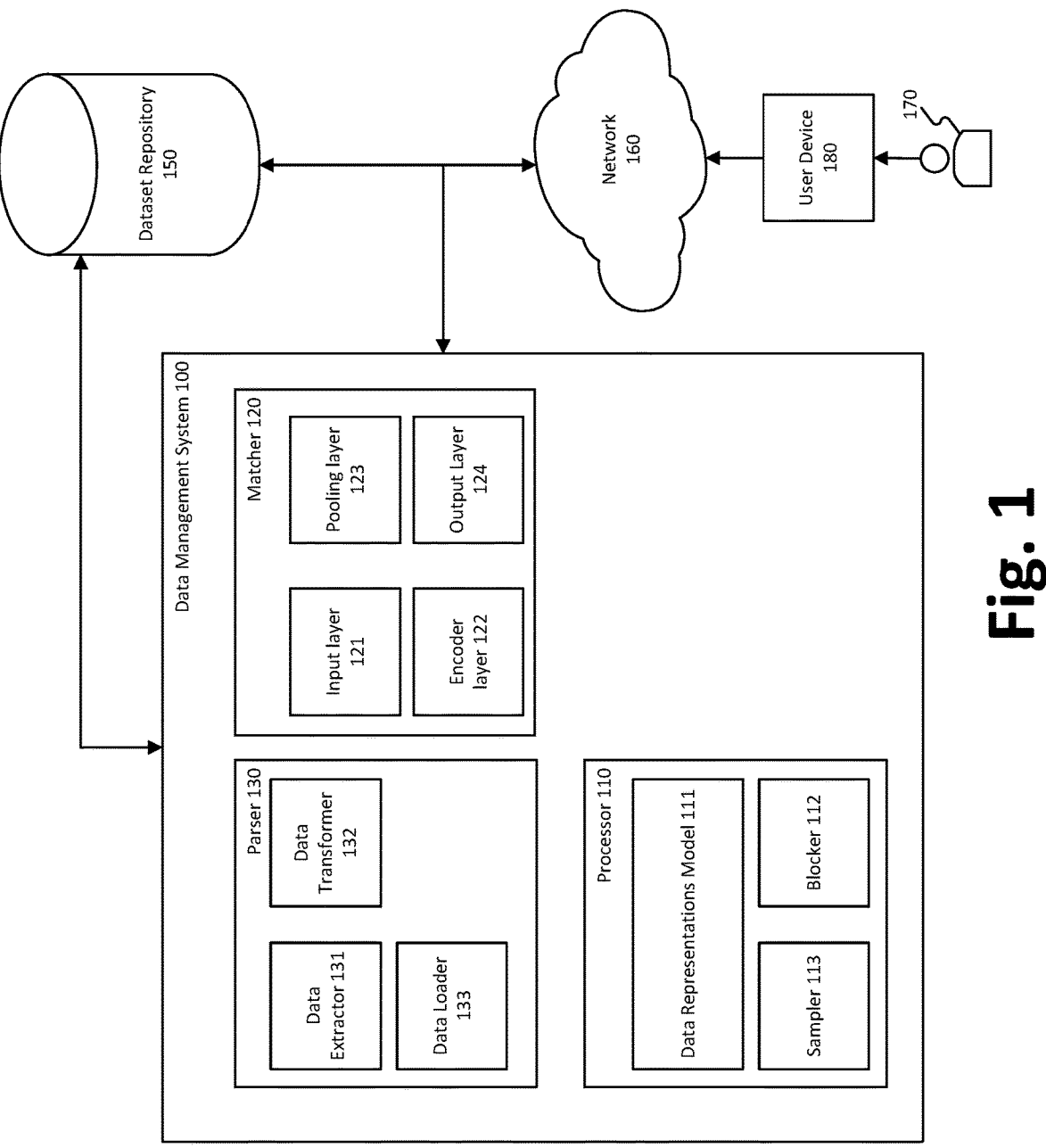
FIG. 1 is a block diagram showing example components of data management system 100, consistent with embodiments of the present disclosure.

In the following detailed description, numerous details are set forth to provide a thorough understanding of the disclosed example embodiments. It is understood by those skilled in the art that the principles of the example embodiments can be practiced without every specific detail. The embodiments disclosed are exemplary and are not intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for using matching model to perform various data management tasks such as data integration (e.g., entity matching), data cleaning (e.g., error correction), data discovery (e.g., column type detection), based on pre-training with no labeled data using natural language techniques by computing systems.

The described embodiments provide a distinct advantage over existing natural language processing techniques. Unlike other processes, the data matching techniques described in the disclosed embodiments can be used for multiple data integration and preparation tasks with different types of entities. Additionally, the described embodiments transform them into a matching based problem, allowing available language models such as BERT to solve data management tasks. By using transformer language models, the embodiments disclosed herein can determine various relationships between entities. By allowing a single data management framework using matching-based problem definition, the embodiments disclosed herein can improve the ability to use natural language processing in various industries and particularized contexts without the need for time-consuming and expensive specialized machine learning solutions built for only one data management task.

FIG. 1 is a block diagram showing example components of data management system 100, consistent with embodiments of the present disclosure. Data management system 100 may comprise a processor 110 to create candidate pairs of entities to check for a match. In some embodiments, the candidate pairs can be supplied by user input, other systems, other data sources, or feedback from data management system 100 or its components. As illustrated in FIG. 1, data management system 100 may include components such as processor 110 and matcher 120. Data management system 100 may also include a data store such as dataset repository 150. Data management system 100 uses matcher 120 to match entities of different entity types in dataset repository 150. In some embodiments, data management system 100 may use data stored in dataset repository 150 as input to train the machine learning (ML) models of processor 110 and matcher 120. Data management system 100 may use existing transformer models in processor 110 and matcher 120. For example, data management system 100 may use an existing language model BERT to identify matching text-based entities. In some embodiments, data management system 100 may use processor 110 to pre-process entities matched by matcher 120.

Processor 110 makes it manageable for downstream modules such as matcher 120 to match a subset of pairs of entities of all possible pairs of available entities. Processor 110 includes multiple pre-processors such as data representation model 111, blocker 112, and sampler 113 to handle the input entities to create potential candidate pairs among various combinations of entities to find matched entities. Data management system 100 may include parser 130 to parse data into entities used by processor 110. In some embodiments, parser 130 may be used by components of processor 110 to further optimize data management system 100.

Data representation model 111 may generate data representations of entity pairings of input entities to help identify entity pairs to use with matcher 120. Data representation model 111 may be a machine learning model trained using contrastive learning techniques to identify the relevant candidate entity pairings to provide for finding matched entities. Data representation model 111 may identify relevant candidate pairs using unlabeled data by reviewing the underlying structure of data in entities. Data representation model 111 may generate data representations that help identify potential entity pairings with similar entities by indicating closeness between entities in entity pairings. Data management system 100 may transform data representations to provide input to other modules in data management system 100. In some embodiments, transformations applied to data representations may replace other modules in processor 110 and matcher 120. For example, data management system 100 may help identify the most similar entity pairings as candidate pairs as identified by their data representations to replace blocker 112. In some embodiments, data representations may be used to train other machine learning models to find matching entities. For example, data management system 100 may help label a subset of data representations to use as training data for matcher 120.

Blocker 112 may help block entity pairings that will never match and identify candidate entity pairings provided as input to matcher 120. Data management system 100 may allow user 170 to configure the blocking function of blocker 112 to limit the number of pairs of entities to be reviewed by matcher 120 for potential matching of entities. Blocking functions may be simple rule-based processors that are fast with a high recall rate and only avoid irrelevant matches. For example, in a scenario for finding matching jobs, blocker 112 may use a no match of "job title" attribute values as a blocking function of blocker 112. In some embodiments, blocker 112 may be configured to include multiple blocking functions to refine further the pairs of entities sent to matcher 120 to predict potential matches. For example, blocker 112 may include a Q-gram blocking function to be applied after a "title" match rule-based blocker function to refine further the possible pairs of entities to share with matcher 120 to predict matches. Q-gram blocking function blocks entity pairs for refining the set of possible pairs for matching by allowing the approximate matching of two sequences in entities. The approximate matching of two sequences may include allowing the sequences to differ by a sub-sequence of length Q. If any two sequences of entities differ by more than a sub-sequence of length Q, then the pairing of the two entities represented by two sequences is blocked from ever pairing. User 170 may configure data management system 100 to select or define blocking functions to include in blocker 112.

In some embodiments, blocking functions employed by blocker 112 may employ similarity search of data representations from data repository 150. Blocking function based on similarity search may be an entity similarity function. In some embodiments, entity similarity function may find similar entity pairs by utilizing filters to identify top-k most similar pairs, or entity pairs of similarity greater than a threshold value. User 170 may set the threshold value at the onset of finding similar entities.

Sampler 113 may filter entity pairs not blocked by blocker 112. Sampler 113 may filter by matching content that may potentially not be considered for finding matching entities in entity pairings. Sampler 113 may be configured by user 170 to select a subset of entities to provide input pairs to matcher 120. Configuration of sampler 113 may include a number of entity pairs of a certain to be considered by data management system 100 or the number of matches expected to be identified by data management system 100. Sampler 113 may allow multiple filters to be stacked together.

Matcher 120 is a machine learning (ML) model that may aid in identifying matching entities. Matcher 120 may retrieve candidate pairs of entities present in dataset repository 150 for finding the best matching entities. Matcher 120 may find the best matching entities by scoring each pair of entities and picking a top percentage of entity pairs with the highest match score. In some embodiments, matcher 120 may pick matched entities by dropping entity pairs with a low match score. Matcher 120 may classify entity pairings based on a data management task requested by user 170. For example, matcher 120, used for an error correction task, may classify entity pairings as either correct correction or incorrect correction.

Matcher 120 may be a machine learning model to help classify entity pairings. As illustrated in FIG. 1, matcher 120 may include an input layer 121 to set up the data for predicting matched entity pairs. Matcher 120 may also include an encoding layer 122, pooling layer 123, and output layer 124 to process input entity pairs, filter out relevant information, and present match results.

Matcher 120 may be a known language model, for example, BERT, Long Former, etc., with modifications. Modification may include modification of existing layers, for example, encoding layer 122 may include a classifier to further structure the minimally structured job entities with long strings. In some embodiments, modifications may include the addition of new layers, such as pooling layer 123, to reduce the number of possible matches and predict the best matches. Output layer 124 may present a binary classification of matched entity pairs based on the data management task using the matching-based approach to solve the task. For example, a data management task for data correction may classify matches as the true corrections to the data in an entity. In another example, output layer 124 of matcher 120 used for a column type detection task may identify matching columns based on type.

Matcher 120 may access entity pairs from dataset repository 150 to predict matches. In some embodiments, matcher 120 may directly receive entity pairs to predict matches. User 170 may supply entity pairs to matcher 120 over network 160, or processor 110 may supply entity pairs to predict a match. In some embodiments, matcher 120 may buffer a set of entity pairs before making a match prediction.

Parser 130 helps in converting entities into a machine-readable format. For example, parser 130 may extract entities in HTML and PDF formats to machine-readable JSON format, providing a hierarchical structure to the entity's content. Parser 130 does not modify the entity's content structure, such as the order of the entity's content or the content itself. Parser 130 may also transform entities without changing the semantic meaning of entities Parser 130 may use a rule-based processor to convert content in entities to a structured format. The hierarchical structure provided for entities processed by parser 130 may depend on the entity type. For example, address data tends to have a known structure of house number, city, and state to convert to semi-structured JSON format data. Parser 130 may use an example template schema to convert an entity's content. In some embodiments, parser 130 may generate a schema based on the provided entities. Parser 130 may review multiple entities of the same type to determine the standard schema to convert the entities to semi-structured JSON format data. For example, parser 130 may determine the attributes to use as keys and hierarchical structure of JSON format data based on available entities and their content and order of the content. Parser 130 may parse entities to transform them for use by matcher 120. Parser 130 may transform entity pairings by replacing certain words with synonyms without compromising the semantic meaning of entities in entity pairs.

In some embodiments, parser 130 may retrieve data from a variety of data sources (e.g., external job postings on websites) and process the data into entities so that they may be used with the remainder of data management system 100. Parser 130 may further include a data extractor 131, data transformer 132, and data loader 133 modules. Data extractor 131 and data transformer 132 may work together to generate the entities stored in dataset repository 150. Data transformer 132 may connect the disparate data extracted from data sources by data extractor 131 and store it in dataset repository 150.

Data extractor 131 retrieves data from different data sources, for example, job posting sites such as Indeed.com or Dice.com, job review sites such as glassdoor.com, social networks such as LinkedIn. Each of these data sources may represent a different type of data source. For example, a data source may be a database similar to dataset repository 150. A data source may represent structured data, such as resumes of candidates. In some embodiments, data sources may be flat files, such as job postings and job reviews. Further, data sources may contain overlapping or completely disparate data sets. In some embodiments, a data source may contain information about job posting while other data sources may contain salary information of the position advertised in the job posting and reviews by previous and current employers in a position similar to the one advertised in the job posting. Data extractor 131 may interact with the various data sources, retrieve the relevant data, and provide that data to the data transformer 132.

Data transformer 132 may receive data from data extractor 131 and process the data into standard formats. In some embodiments, data transformer 132 may normalize data such as dates, addresses, job titles. For example, a data source for job postings may include job titles as strings (for example, engineer, director, manager, etc.), while a data source for job reviews may store job titles as various levels (for example, L1, L2, etc.) within the organization. In this example, data transformer 132 may modify or normalize the data provided through data extractor 131 into a consistent format. Accordingly, data transformer 132 may effectively clean the data provided through data extractor 131 so that all of the data, although originating from a variety of sources, has a consistent format. In some embodiments, data transformer 132 may clean data by combining data from different sources. For example, job reviews data may include pay ranges for each position, but the job postings may not include the pay range. In the second example, data transformer 132 may include the missing pay ranges in the job posting entities generated by parsing web pages of job postings.

Moreover, data transformer 132 may extract additional data points from the data sent by data extractor 131. For example, data transformer 132 may determine if a job is a remote position by extracting separate data fields for job position location and company location. Data transformer 132 may also perform other linear and non-linear transformations and extractions on categorical and numerical data, such as normalization and demeaning. In some embodiments, data transformer 132 may anonymize data extracted by data extractor 131. Data transformer 132 may anonymize data to avoid private data from being used to train machine learning models in data management system 100. Data transformer 132 may provide the transformed or extracted data to data loader 133. In some embodiments, data transformer 132 may store the transformed data in dataset repository 150 for later use by data loader 133 and other modules of processor 110.

Data loader 133 may receive the normalized data from data transformer 132. Data loader 133 may merge the data into varying formats depending on the specific requirements of data management system 100 and store the data in an appropriate storage mechanism such as dataset repository 150.

Dataset repository 150 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access to related records stored in disparate tables. For example, in an RDBMS, tables can be linked by a referential column, and the RDBMS can join tables together to retrieve data for a data structure. In some embodiments, the dataset repository 150 can be a non-relational database system (NRDBMS) (e.g., XML, Cassandra, CouchDB, MongoDB, Oracle NoSQL Database, FoundationDB, or Redis). A non-relational database system can store data using a variety of data structures such as, among others, a key-value store, a document store, a graph, and a tuple store. For example, a non-relational database using a document store could combine all of the data associated with a particular identifier into a single document encoded using XML. Dataset repository 150 can also be an in-memory database such as Memcached. In some embodiments, the contents of dataset repository 150 can exist both in a persistent storage database and in an in-memory database, such as is possible in Redis.

Data management system 100 can receive requests for predicting matches between entities over network 160. Network 160 can be a local network, Internet, or a cloud. User 170 can send requests for matching entities to data management system 100 over network 160. User 170 can interact with data management system 100 over user device 180. User device 180 can be a variety of devices such as a tablet, laptop, or portable computer using a web browser or an installed application.

The components of data management system 100 can run on a single computer or can be distributed across multiple computers or processors. The different components of data management system 100 can communicate over a network (e.g., LAN or WAN) 160 or the Internet. In some embodiments, each component can run on multiple computer instances or processors. The instances of each component of the data management system 100 can be a part of a connected network such as a cloud network (e.g., Amazon AWS, Microsoft Azure, Google Cloud). In some embodiments, some, or all, of the components of data management system 100 are executed in virtualized environments such as a hypervisor or virtual machine.

Figure 2A:
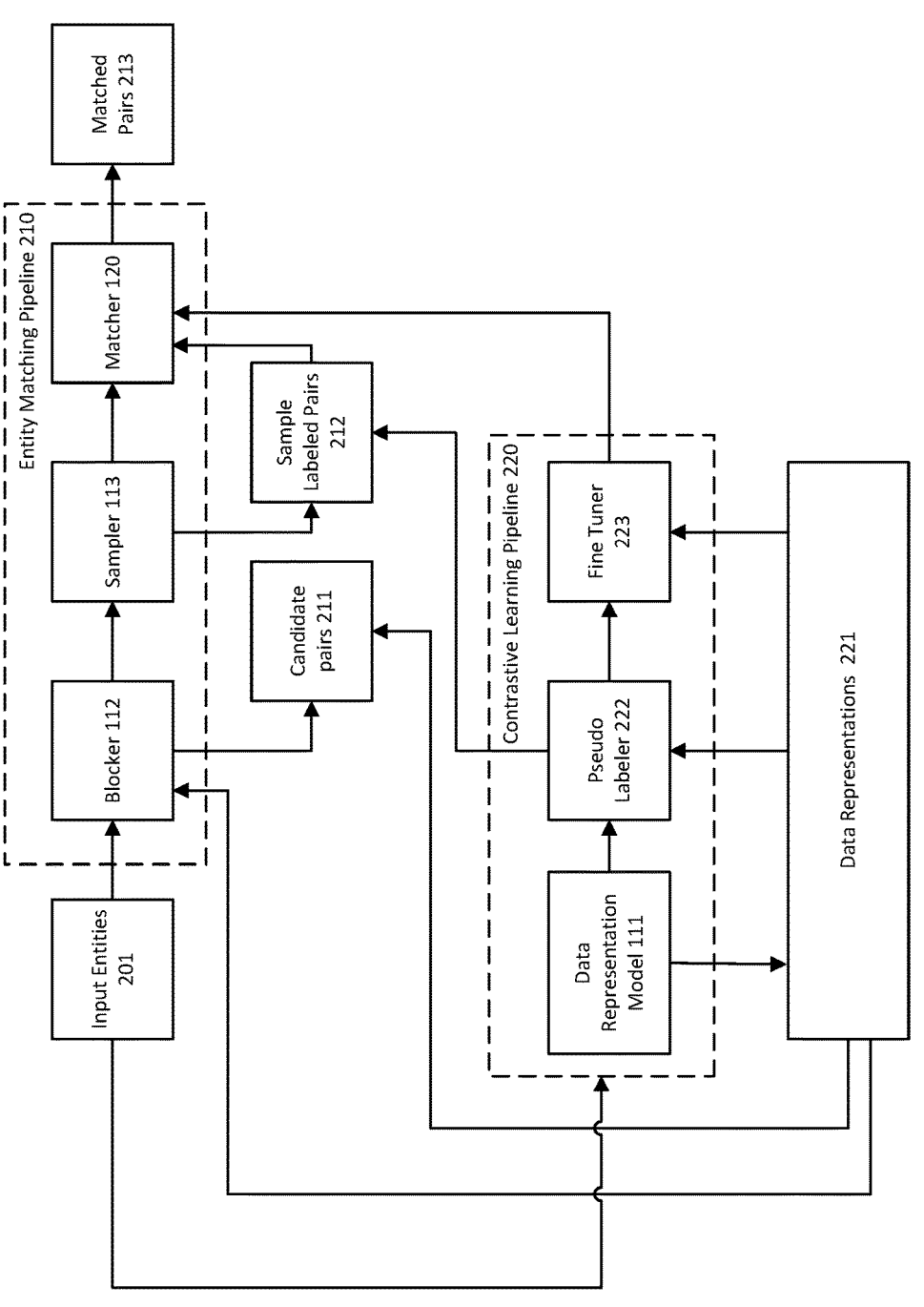
FIG. 2A is a flow diagram of solving an example data integration task of entity matching using data management system 100, consistent with embodiments of the present disclosure.

FIG. 2A is a flow diagram of solving an example data integration task of entity matching using data management system 100, consistent with embodiments of the present disclosure. As illustrated in FIG. 2A, data management system 100 performs entity matching using two pipelines: entity matching pipeline 210 on top and contrastive learning pipeline 220 at the bottom. Entity matching pipeline 210 is a standard entity matching pipeline and may include blocker 112 and matcher 120, contrastive learning pipeline 220 includes data representation model 111 for understanding representative structures of data sets from dataset repository 150. Data representations model 111 is trained on input entities 201 to learn similar data representations of entities in input entities 201.

Contrastive learning pipeline 220 provides input to modules in entity matching pipeline 210. Contrastive learning pipeline 220 may provide an output of data representation model 111 as input to modules in entity matching pipeline 210. For example, contrastive learning pipeline 220 may provide data representations 221 to blocker 112 in entity matching pipeline 210 to identify candidate pairs 211 of entities to find matching entities. In some embodiments, contrastive learning pipeline 220 may transform the output from data representation model 111. Contrastive learning pipeline 220 may transform output for better performance of modules of entity matching pipeline 210. For example, contrastive learning pipeline 220 may transform data representations 221 by using pseudo labeler 222 to identify similar data representations entities with high confidence. In another example, contrastive learning pipeline 220 may transform data representations 221 by using fine tuner 223. A detailed description of fine tuner 223 and its components is provided in FIG. 2C description below. In some embodiments, pseudo labeler 222 and fine tuner 223 may be part of data representation model 111. Data representation model 111 may be a machine learning model with multiple layers and pseudo labeler 222 and fine tuner 223 as output layers of the machine learning model.

Contrastive learning pipeline 220 may improve the performance of data representation model 111 by improving the quality of data representations 221. Data management system 100 may evaluate the quality of data representations 221 generated by contrastive learning pipeline 220 based on candidate pairs 211 generated using data representations 221. Contrastive learning pipeline 220 may improve the quality of data representations 221 by learning about transformation-invariant representations of data in data representations 221 formed using input entities 201. To learn transformation-invariant representations, contrastive learning pipeline 220 performs transformations of data in entities (e.g., input entities 201). Transformations may include synonym replacement, span deletion, and other transformations that preserve the semantic meaning. In some embodiments, contrastive learning pipeline 220 may achieve more fine-grained transformations by transforming entities in input entities 201 using a data augmentation technique. For example, contrastive learning pipeline 220 may transform a word embedding vector representation of each word in an entity in input entities 201. These transformations of entities of input entities 201 directly and at the word embedding level help generate multiple closely related entities for contrastive training of data representation model 111. Data management systems may use data augmentation operators to generate closely related entities to the original entity that are used as training data for data representation model 221. Data augmentation operators chosen to generate variants is based on data management tasks (e.g., error correction, column type detection, entity matching, etc.).

In some embodiments, contrastive learning pipeline 220 improves data representation model 111 by obtaining negative examples to train data representation model 111 to learn how to separate dissimilar entities in input entities 201. Contrastive learning pipeline 220 identifies dissimilar entities in input entities 201 by training data representation model 111 on groups of entities in input entities 201. Contrastive learning pipeline 220 may provide the groups as inputs to identify dissimilar entities within each group that may only differ slightly. In some embodiments, contrastive learning pipeline 220 may obtain groups of entities by k-means clustering. Data identifying dissimilar entities within a subset versus the overall input entities 201 makes data representation model 111 learn the smallest differences between entities in input entities 201.

Pseudo labeler 222 helps improve the performance of matcher 120 by extracting additional similarity knowledge from data representations 221 and applying as labels to entities in input entities 201 represented as entity pairs in data representations 221. In some embodiments, similarity knowledge is probability labels to apply to candidate pairs 211. In some embodiments, pseudo labeler 222 may apply probability labels to sample labeled pairs 212.

Pseudo labeler 222 may include an embedding model to determine labels to attach to data representations 221 to find subset of entity pairs that are most similar or different. Embedding models used in pseudo labeler 222 are pre-trained embedding models based on existing language models such as BERT. A detailed description of pre-training embedding models is provided in FIG. 2B description below.

Pseudo labeler 222 extracts similarity knowledge by identifying unlabeled entity pairs in candidate pairs 211 by measuring the confidence value of match between entities in each pair of unlabeled entity pairs. Pseudo labeler 222 measures the confidence value of matching entities in candidate pairs 211 by calculating cosine similarity evaluated by an embedding model. In some embodiments, pseudo labeler 222 assigns a positive label if cosine similarity is above a positive threshold and a negative label if cosine similarity is below a negative threshold.

Data management system 100 may customize the values for thresholds to determine labels. Data management system 100 may automatically set custom values for thresholds. In some embodiments, data management system 100 may set threshold values based on data management tasks to avoid bias when training a machine learning model in matcher 120. For example, an entity matching, or data cleaning task will have many pairs tagged with negative labels as most entities won't match or will already be clean. In such a scenario, it can be important to have a very low negative threshold value to reduce the number of candidate pairs tagged with negative labels. In some embodiments, data management system 100 may allow user customization of threshold values. Data management system 100 may use a combination of a manually set threshold for a certain percentage of entities, and the rest are set automatically based on heuristics (e.g., hill-climbing heuristics) to find an optimal value for the current set of input entities 201.

In some embodiments, data management system 100 may use the output of data representation model 111 to replace a step of execution of module in entity matching pipeline 210. For example, data representation model 111 performs a similarity search to identify entity pairs with similar entities, like blocker 112 as candidate pairs. Contrastive learning pipeline 220 can transform the data representations 221 to replace blocker 112 by applying a nearest neighbor technique to search for the top-k most similar entities in data representations 221 as candidate pairs 211.

Data management system 100 handles various data management tasks by formulating tasks as matching related data items. Data items may include table rows, table columns, or cell values in a table of input entities 201. Data management system 100 may perform multiple data management tasks by customizing the binary relations between data item pairs. For example, a binary relation may be whether two entities refer to the same real-world entity in an entity match task, whether an entity is a correct candidate correction to an erroneous entity in a data cleaning task, or whether two table columns have a same semantic type in a data discovery task.

Data management system 100 may also update individual modules in entity matching pipeline 210 based on data management tasks. For example, in an entity matching task, blocker 112 may generate a small set of candidate pairs 211 with a high recall rate, and matcher 120 may generate matched pairs 213 of candidate pairs 211 with a high recall and high precision rate. Contrastive learning pipeline 220 provides the necessary transformed data representations of data representations 221 for different requirements of blocker 112 and matcher 120.

Contrastive learning pipeline 220 may achieve a high recall rate by generating a vector representation of each data item of data representations 221 and indexing the vectors for fast similarity search using blocker 112 to identify candidate pairs. In some embodiments, contrastive learning pipeline 220 may cluster generated vectors and sample vectors from a single cluster to train data representative model 221 to improve its recall rate The selected sample vectors within a cluster are negative samples of dissimilar entity pairs that are harder to distinguish. Data representation model 221 may be trained using selected negative samples from within a cluster to learn to identify meaning features in vectors representing entities (e.g., input entities 201).

Figure 2B:
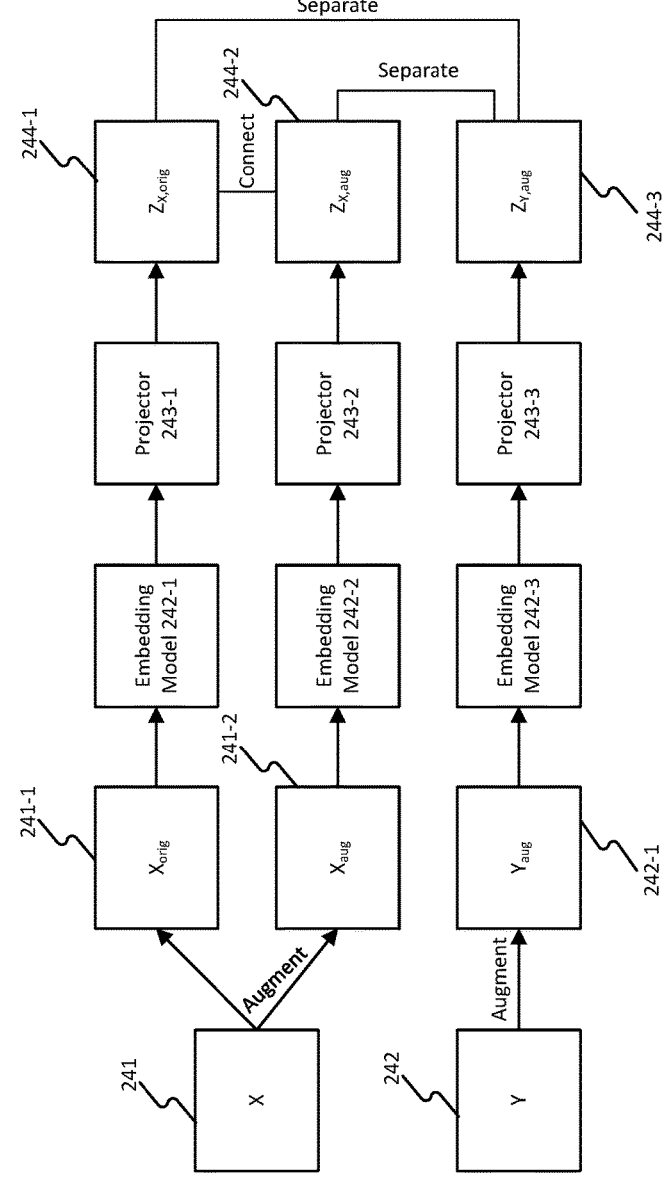
FIG. 2B illustrates a flow diagram of an example data representation model for contrastive pre-training, consistent with embodiments of present disclosure.

FIG. 2B illustrates a flow diagram of an example data representation model for contrastive pre-training, consistent with embodiments of present disclosure. Data representation model 111 is pre-trained to minimize distance between pairs of similar entities and maximize distance between pairs of distinct entities.

Data management system 100 uses data augmentation operators to generate variants of same entity to train data representation model 111 with minimal to no labeled data. For example, entity 241-2 is a variant of entity 241-1. Data management system 100 may use different data augmentation operators based on data management task (e.g., entity matching, error correction, column type detection, etc.) and preserve semantic meaning of entities (e.g., input entities 201 of FIG. 2A). For example, a data representation model used for an entity matching task may utilize data augmentation operators for deleting, replacing, swapping, or inserting a token, such as a word in an entity. Data augmentation operators associated with an entity matching task may include deleting and shuffling a span with multiple tokens or entire column. In an error correction task, data management system 100 may only apply data augmentation operators that can be applied to entire column and not just one token, such as a cell value. For example, a column shuffle operator may be used to shuffle cell values of entities in a column.

In some embodiments, data management system 100 may use cutoff operator to apply across a row or column of vector representations of entities (e.g., entities 241-1 to 241-3) generated using data augmentation operators. Cutoff operators may include token cutoff, feature cutoff, or span cutoff.

Data augmentation operators generate variants of entities (e.g., entities 241-1 to 241-3) while maintaining semantic meaning. For example, entities in a computer vision are images and their variants are obtained data augmentation operators that rotate, flip, or crop original images representing entities. Data augmentation operators help generate pairs of entities (original entity and variant) that are similar to train data representation model 111 to learn to match/distinguish entities. Training data generated by data augmentation operators may help train data representation model 111 irrespective of labels associated or not associated with data as long as variants similar to original entity by maintaining same semantic meaning. Data representation model 111 training on such data can identify matching similar variants and original entity.

Data management system 100 supplies augmented vector representations of input entities 201 (as shown in FIG. 2A) to instances of embedding model 242-1 to 242-3. Embedding models 242-1 to 242-3 are encoders designed using a transformer. In some embodiments, data management system 100 uses a pre-trained language model such as BERT as a transformer. As illustrated in FIG. 2B, projector instances 243-1 to 243-3 may take as input encoded representations of entities and their variants to map to a space applying contrastive loss. In some embodiments, projector 243-1 to 243-3 may be a linear layer. Projectors 243-1 to 243-3 may map to vector space by generating vector representations of entities 241-1 to 241-3.

Fine tuner 223 uses the pre-trained embedding model instances 242-1 and 242-3 in generating pairwise matching model used in fine tuner 223. Fine tuner 223 handles pairs of entities using embedding models pre-trained using single entities to capture data representations (e.g., data representations 221 of FIG. 2A)

Figure 2C:
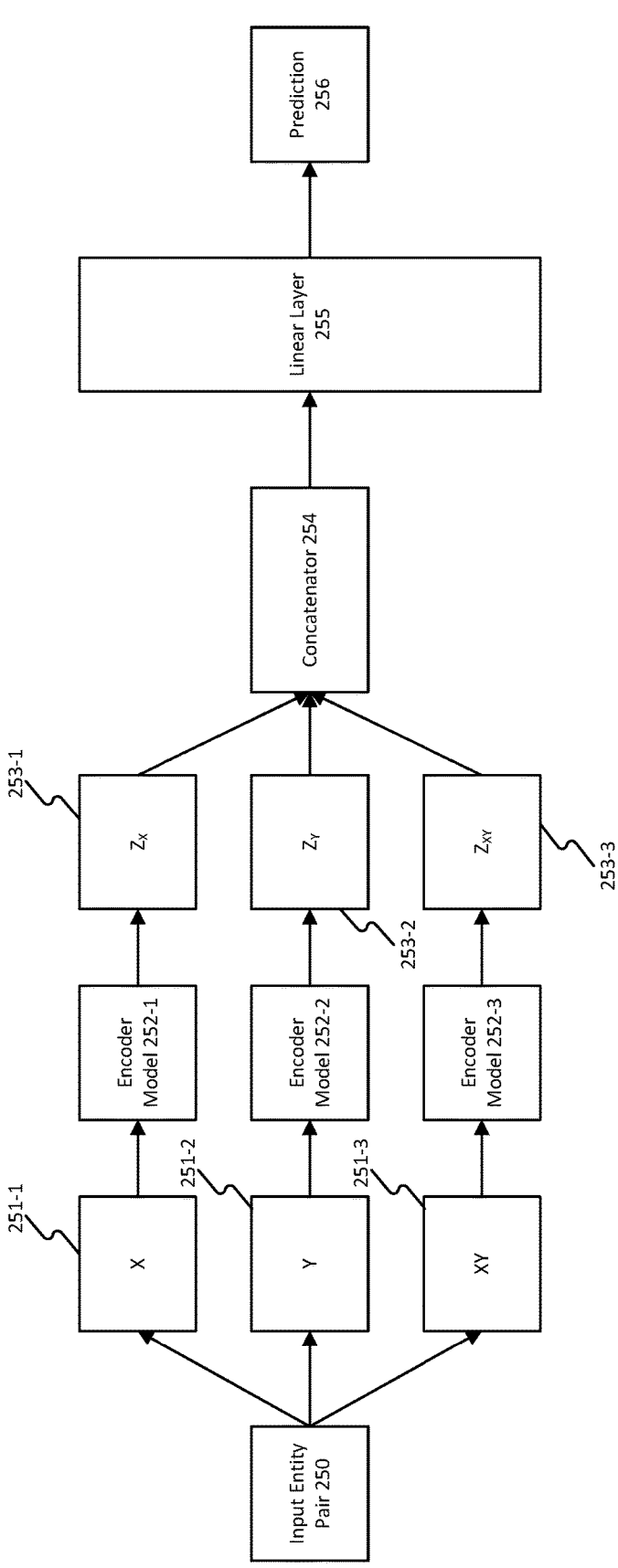
FIG. 2C illustrates a flow diagram of an example of dataflow in a fine tuner, consistent with embodiments of present disclosure.

FIG. 2C illustrates a flow diagram of an example of dataflow in a fine tuner, consistent with embodiments of present disclosure. Fine tuner 223 may include an embedding model that fine tunes the similarity results by concatenating the input entity pair of serialized entities. In some embodiments, fine tune 223 may also include a training pipeline (not shown in FIG. 2C), such as gradient descend. A detailed description of serialization of entities is provided in FIG. 4 description below. Fine tuner 223 captures similarity and differences between entities in an input entity pair 250. As illustrated in FIG. 2C, fine tuner 223 receives input entity pair 250 and encodes individual entities 251-1 and 251-2 and concatenated entity 251-3. Entities 251-1, 251-2 and the concatenated entity pair 251-3 are serialized versions of entities in input entity pair 250. As illustrated in FIG. 2C, serialized entities 251-1 to 251-3 are input to instances of encoder model 252-1 to 252-3. Encoder models 252-1 to 252-25-3 generate d-dimension vector representations of serialized versions of individual entities 251-1, 251-2 and concatenated entity pair 251-3. Fine tuner 223 may include a linear layer 255 that is specific to data management task (e.g., column type detection, error correction, etc.) being handled by data management system 100. In some embodiments, there may be multiple task specific linear layers in fine tuner 223. Linear layer 255 may take as input concatenated outputs 253-1 to 253-3 of encoder model instances 252-1 to 252-3. Concatenator 254 may concatenate encoded outputs 253-1 to 253-3. Concatenator 254 may use vector concatenation to concatenate outputs 253-1 to 253-3 to generate 2d dimension vector. Linear layer 255 may be a fully connected layer and also include a SoftMax function that predicts whether the input pair matches or not included as prediction 256. Fine tuner 223 may be trained before including it in contrastive learning pipeline 220. Fine tuner 223 may train by initializing network of machine learning model formed with encoder model (e.g., encoder models 252-1 to 252-3) and linear layer with pre-trained weights. Fine tuner 223 is trained until a convergence is achieved.

Figures 3A, 3B, 3C:
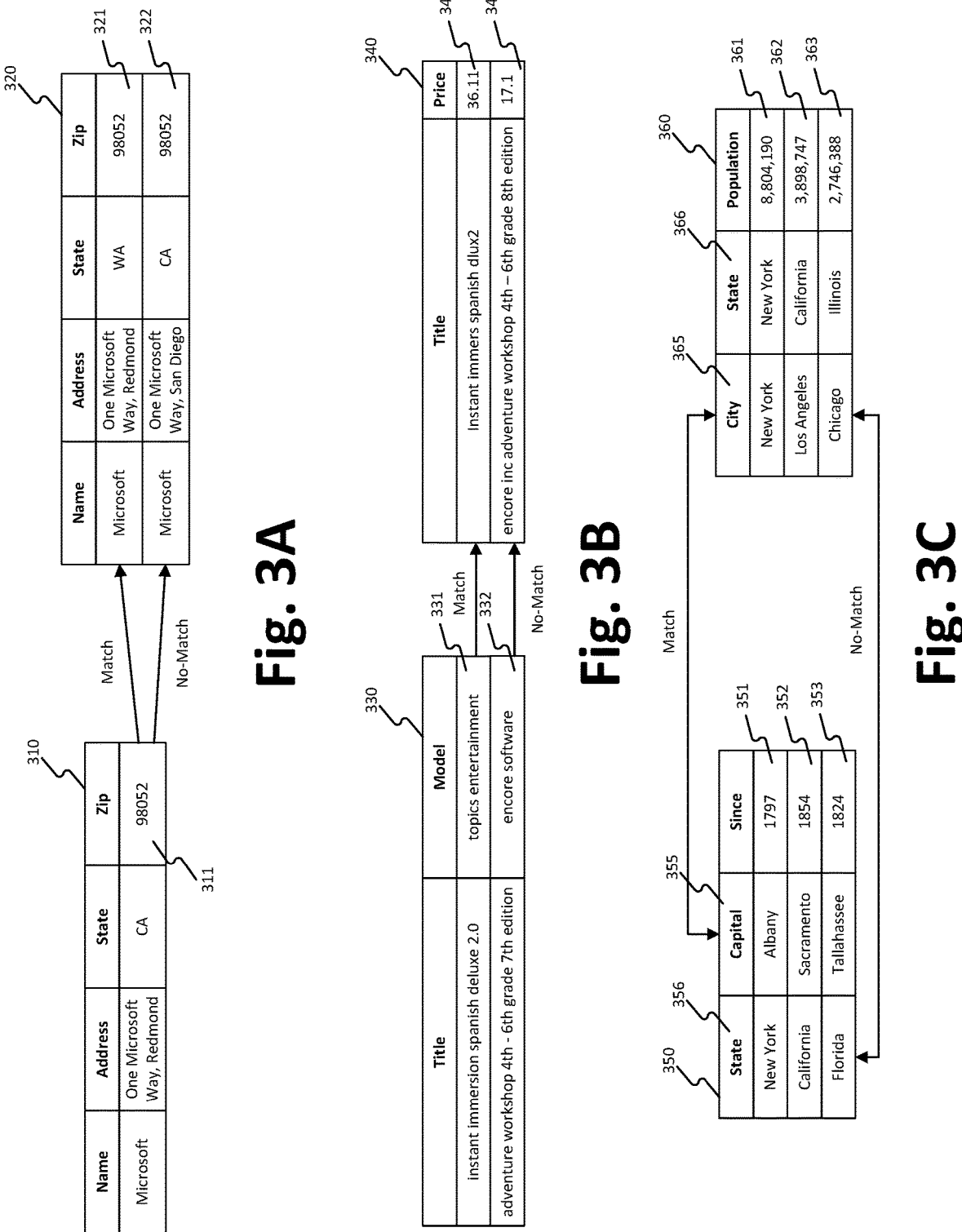
FIGS. 3A-3C illustrates example tabular representations of data management tasks performed between pairs of entity entities, consistent with embodiments of the present disclosure.

FIGS. 3A-3C illustrate example tabular representations of data management tasks performed between pairs of entities, consistent with embodiments of the present disclosure. As illustrated in FIG. 3A, entities in table 310 are corrected by performing a match to entities in table 320. Data management system 100 may perform pairwise matching of entities in tables 310 and 320. Data management system 100 skips the execution of blocker 112 (as shown in FIG. 1) to identify candidate pairs when it receives a request for a data cleaning task. In some embodiments, data management system 100 may use alternative methods for generating candidate pairs of entities. Alternative methods may include a rule-based methods (e.g., Jaccard Similarity) to enumerate possible candidate pairs. In some embodiments, data management system 100 may use rule-based methods to find textual similarity or syntactic similarity between sequences of textual entities. In some embodiments, data management system 100 may use different blocking techniques as alternative methods for generative candidate pairs of entities. For example, different blocking techniques may include, rule-based blocking, schema-agnostic blocking, meta blocking, and other deep learning techniques, employing recurrent neural network models.

In some embodiments, data representation model 111 may use address, state, and zip code fields values in tables 310 and 320 to identify the underlying structure as a physical location address. Data management system 100 may use pseudo labeler 222 (as shown in FIG. 2A) to label each entity pairing in tables 310 and 320 to identify which entity has a correct address. Data management system 100 may fine-tune the labeled entity pairings to identify the correction to apply to an incorrect entity. Data management system 100 may generate table 320 with possible corrections to entity 311. Data management system 100 may generate entities 321 and 322 to include in table 320 and perform a match between entities in tables 310 and 320. Data management system 100 may use the matched entity as corrected entity. Correction of an entity may include correcting a typo, adding a missing data, for example, missing city in an address.

Data management system 100 may not perform certain steps when performing an error correction task. For example, pseudo labeler 222 (as shown in FIG. 2) may not be applied as pseudo labeling is not based on similarity. Blocker 112 (as shown in FIG. 1) may not be used unless candidate entities generated as part of error correction is a large set. For example, if a data management system 100 chooses to replace a city name typo in entity 311 with a large set of city names without considering the state field and zip code field values then a blocker is needed to refine set of entities to share with matcher 120 (as shown FIG. 1) to find the corrected entity (e.g., entity 321).

As illustrated in FIG. 3B, entities in table 330 are matched to entities in table 340 by data management system 100. Data management system 100 may find a match between entities 331 and 341 and a mismatch between entities 332 and 342. Data management system 100 may use entity matching pipeline 210 and contrastive learning pipeline 220, as shown in FIG. 2A, to perform matching of entities in tables 330 and 340. Data management system 100 may use contrastive learning pipeline 220 to perform a transformation of entities to determine a match. For example, data management system 100 may translate entity 341 title field "instance immers spanish dlux2" to "instant immersion spanish deluxe 2.0" in English to match entities 331 and 341. In some embodiments, data management system 100 may transform portions of entities 331 and 341 by formatting content in entities 331 and 341. For example, text "dlux2" in entity 341 is formatted to match text "deluxe 2.0" in entity 331. Data management system 100 will not find a match between entities 332 and 342, which are ignored for entity matching task.

As illustrated in FIG. 3C, column types in tables 350 and 360 are identified to find matching columns to detect column types. Data management system 100 may detect type of column 355 by performing match semantic of columns in tables 350 and 360.

Data management system 100 may review all entities 351-353 and 361-363 to identify types of columns 355-356 and 365-366. Capital column 355 matches city column 365 but state column 356 does not match city column 365. Data management system 100 may use data representation model 111 to learn the representation of each column in tables 350 and 360 as high dimensional vectors. Data management system 100 may then identify candidate columns based on data representations (e.g., data representations 221 of FIG. 2A) of columns in tables 350 and 360. Data management system 100 may use a graph parsing algorithm as part of matcher 120 to find clusters of columns predicted to be of the same type. Data management system 100 may train matcher 120 by applying pseudo labels and fine-tuning data representations 221. Data management system 100 may use a column parser to identify each column's type.

Figure 4:
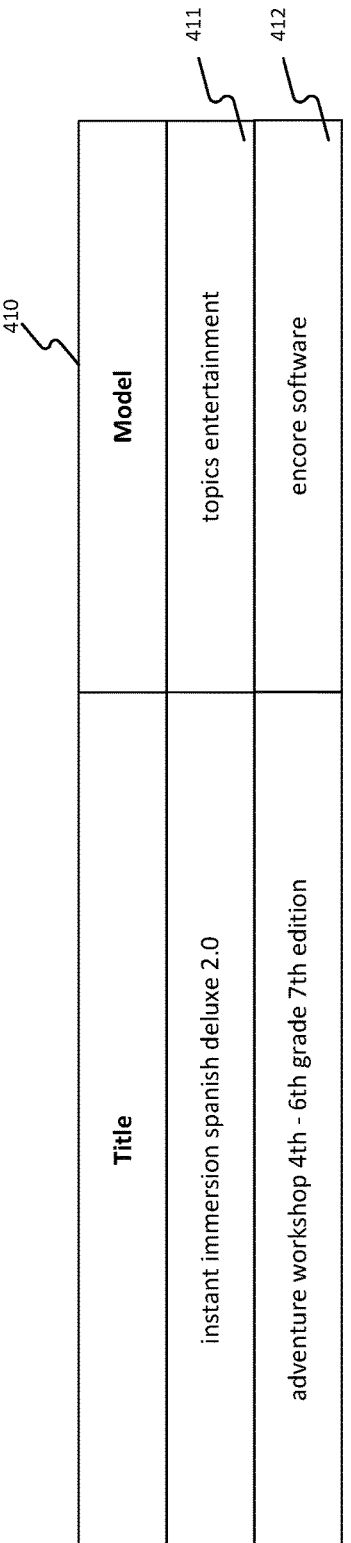
FIG. 4 shows an example serialization of data by pre-trained language model, consistent with embodiments of the present disclosure.
Figure 4:
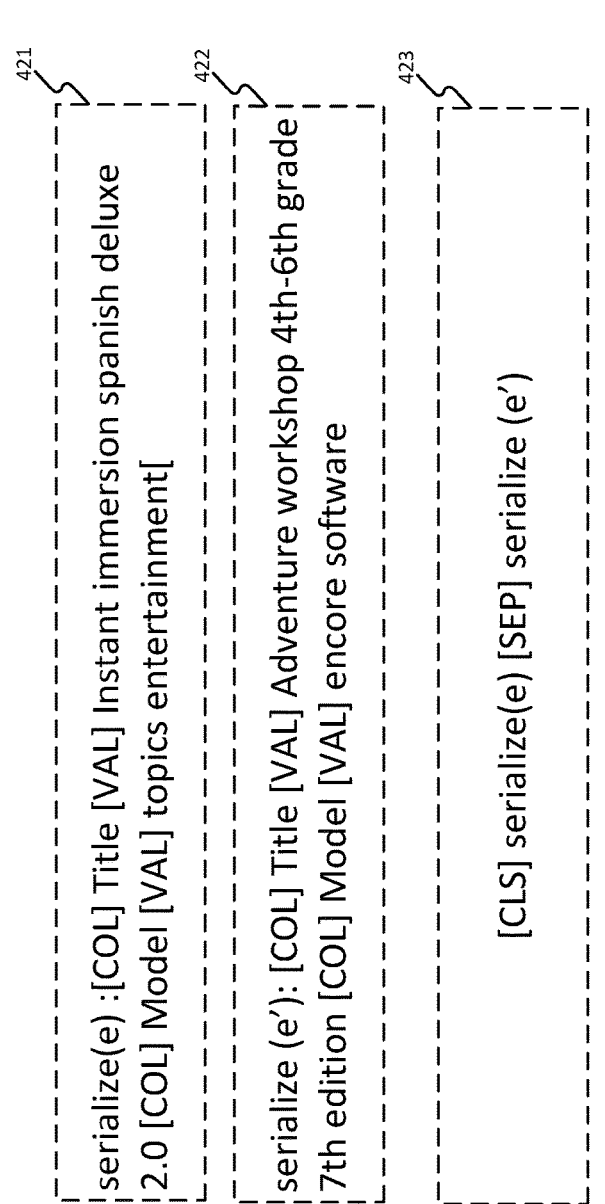

FIG. 4 shows an example serialization of data by pre-trained language model, consistent with embodiments of the present disclosure. Data present in table 410, like table 330 (as shown in FIG. 3), is serialized by input layer 121 (as shown in FIG. 1) of matcher 120 (as shown in FIG. 1). Input layer 121 may include a serializer to serialize data to strings. As illustrated in FIG. 4, book details entities represented as table rows 411 and 412 may be serialized to serialized entities 421 and 422. A similar layer may also be present in data representation model 111 as part of fine-tuning data representations 221 (as shown in FIG. 2A).

Data management system 100 may convert each row of table 410 representing an entity by using specialized tokens, such as "[COL]" and "[VAL]," to represent the column name and the value of the row in a specific column. Serializer module requests the column name and value and creates an entity of the form "[COL]<column name>[VAL] <column value>." Data management system 100 may iteratively serialize each row's column and append them together to form a serialized entity. For example, serialized entities 421 and 422 represent rows 411 and 412 of table 410, with all column names and values in columns appended together using special tokens "[COL]" and "[VAL]." Data management system 100 may generate an embedding model to include in blocker 112 that first serializes and then encodes using a pre-trained language model, for example, BERT.

Data management system 100 may serialize pairs of entities to identify matched entity pairs. Data management system 100 may support pair classification using a pre-trained language model by concatenating multiple entities into a single sequence using special tokens "[CLS]" and "[SEP]," as shown in serialized entity pair 423. As illustrated in entity pair 423, data management system 100 adds "[CLS]" token to the beginning of a series of tokens and "[SEP]" token to separate the serialized entities. Pairwise matching model used in matcher 120 is fine-tuned by including task specific layers after transformer layer (e.g., input layer 121 of FIG. 1) to serialize entities. Task specific layers may include a linear fully connected layer and a SoftMax layer for binary classification.

Figure 5:
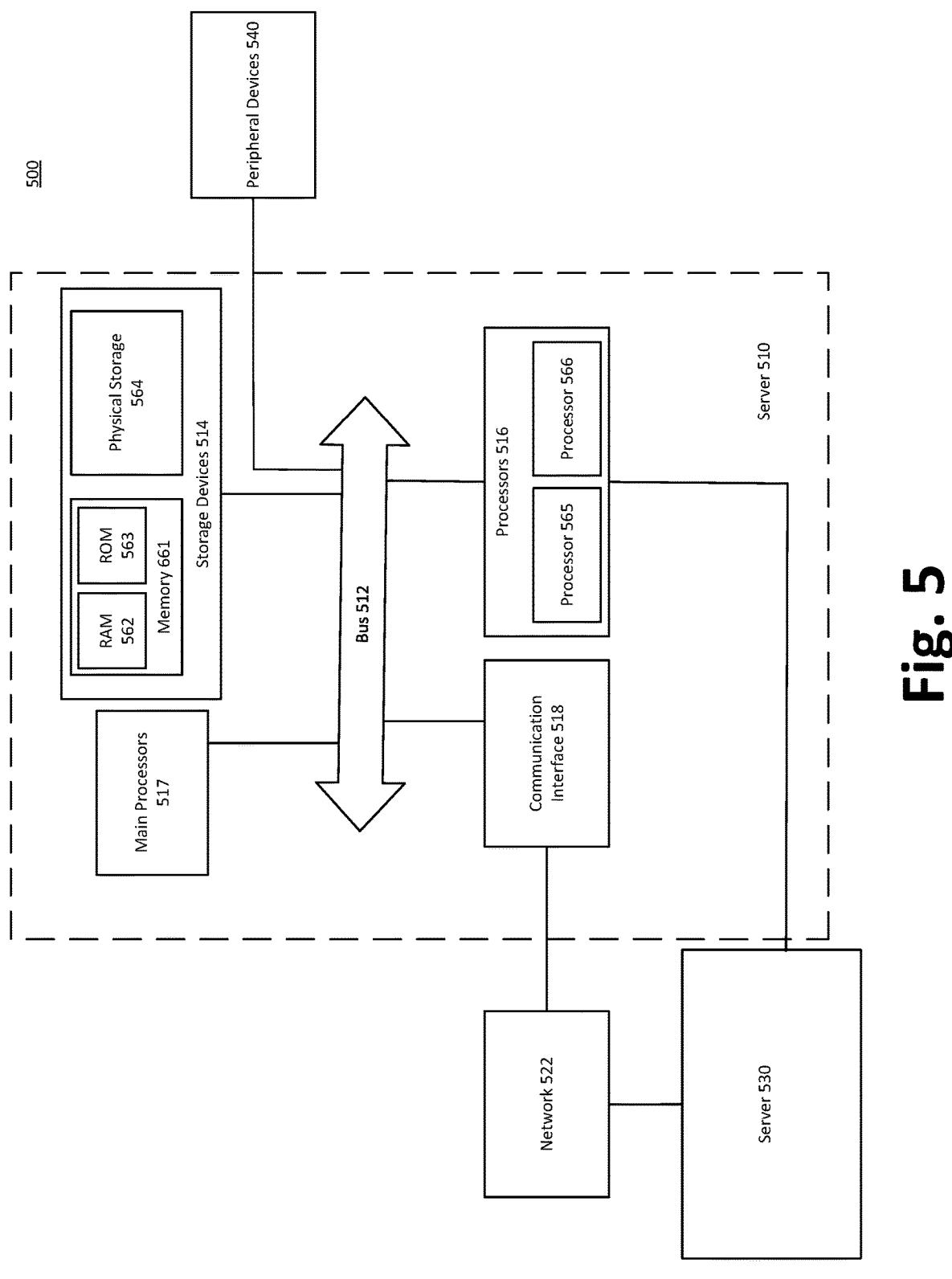
FIG. 5 illustrates a schematic diagram of an example distributed system, according to some embodiments of the present disclosure.

FIG. 5 illustrates a schematic diagram of an example distributed system, according to some embodiments of the present disclosure. According to FIG. 5, server 510 of distributed computing system 500 comprises a bus 512 or other communication mechanisms for communicating information, one or more processors 516 communicatively coupled with bus 512 for processing information, and one or more main processors 517 communicatively coupled with bus 512 for processing information. Processors 516 can be, for example, one or more microprocessors. In some embodiments, one or more processors 516 comprises processor 565 and processor 566, and processor 565 and processor 566 are connected via an inter-chip interconnect of an interconnect topology. Main processors 517 can be, for example, central processing units ("CPUs")

Server 510 can transmit data to or communicate with another server 530 through network 522. Network 522 can be a local network similar to network 160 (as shown in FIG. 1), an internet service provider, Internet, or any combination thereof. Communication interface 518 of server 510 is connected to network 522, which can enable communication with server 530. In addition, server 510 can be coupled via bus 512 to peripheral devices 540, which comprises displays (e.g., cathode ray tube (CRT), liquid crystal display (LCD), touch screen, etc.) and input devices (e.g., keyboard, mouse, soft keypad, etc.).

Server 510 can be implemented using customized hard-wired logic, one or more ASICs or FPGAs, firmware, or program logic that in combination with the server causes server 510 to be a special-purpose machine.

Server 510 further comprises storage devices 514, which may include memory 561 and physical storage 564 (e.g., hard drive, solid-state drive, etc.). Memory 561 may include random access memory (RAM) 562 and read-only memory (ROM) 563. Storage devices 514 can be communicatively coupled with processors 516 and main processors 517 via bus 512. Storage devices 514 may include a main memory, which can be used for storing temporary variables or other intermediate information during execution of instructions to be executed by processors 516 and main processors 517. Such instructions, after being stored in non-transitory storage media accessible to processors 516 and main processors 517, render server 510 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid] state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 516 or main processors 517 for execution. For example, the instructions can initially be carried out on a magnetic disk or solid-state drive of a remote computer. The remote computer can load the instructions into its dynamic memory and send the instructions over a telephone line using a modem. A modem local to server 510 can receive the data on the telephone line and use an infrared transmitter to convert the data to an infrared signal. An infrared detector can receive the data carried in the infrared signal, and appropriate circuitry can place the data on bus 512. Bus 512 carries the data to the main memory within storage devices 514, from which processors 516 or main processors 517 retrieves and executes the instructions.

Data management system 100 (as shown in FIG. 1) or one or more of its components may reside on either server 510 or 530 and may be executed by processors 516 or 517. In some embodiments, the components of data management system 100, processor 110, and matcher 120 may be spread across multiple servers 510 and 530. For example, processor 110 components 111-113 may be executed on multiple servers.

FIG. 6 is a flowchart showing an example method for data management using a multi-purpose data management system, consistent with embodiments of the present disclosure. The steps of method 600 can be performed by, for example, data management system 100 of FIG. 1 executing on or otherwise using the features of computing device 500 of FIG. 5 for purposes of illustration. It is appreciated that the illustrated method 600 can be altered to modify the order of steps and to include additional steps.

In step 610, data management system 100 may receive at least two sets of data and a data management task. Two sets of data each include entities (e.g., input entities 201 of FIG. 2A). Data management system 100 may identify relevant candidate pairs and perform binary classification for matching entity pairs in received data sets. Data management system 100 may receive data sets from dataset repository 150 (as shown in FIG. 1) via network 160 (as shown in FIG. 1). In some embodiments, data management system 100 may receive data sets directly from user 170 (as shown in FIG. 1) via user device 180 (as shown in FIG. 1).

In step 620, data management system 100 may determine a location of each entity in a representative space based on the representative structure of the set of entities in the data sets received in step 610. Data representation model 111 may help generate data representations (e.g., data representations 221 of FIG. 2A) based on the location of each entity in a representative space. Data management system 100 may generate a vector representation of each entity as part of determining a location in a representation space.

Data management system 100 may determine the location of entities in input data (e.g., input entities 201 of FIG. 2A) in a representative space to create data representations of entities (e.g., data representations 221 of FIG. 2A). Data management system may use a second machine learning model (e.g., data representation model 111 of FIG. 1) to determine the location of entities in representative space by reviewing the representative structure of entities. Data management system 100 may pre-train a machine learning model using a contrastive learning technique. Contrast learning techniques may include a contrastive objective. The machine learning model can be a convolution neural network model or recurrent neural network model or transformer model such as existing language models (e.g., BERT).

In some embodiments, data management system 100 may build representative space by transforming each entity in input data sets (e.g., input entities 201 of FIG. 2A) into vector representations. Data management system 100 may use an existing language model such as BERT to generate vector representations of entities.

Data management system 100 may pre-process entities in received data sets before determining a location in a representative space. Data management system 100 may pre-process entities and transform them while maintaining the semantic meaning of entities. For example, data management system 100 may perform span replacement in an entity by using similar meaning words in place of replaced words. Such span replacement also helps train data representation model 111 for identifying entity's location in representative space.

In step 630, data management system 100 may determine a set of representative entity pairs. The representative entity pairs include one entity from each of the two data sets received in step 610. Data management system 100 may generate representative pairs by indicating the level of closeness between entities based on the locations of entities in representative space as identified in step 620. Data management system 100 may filter entity pairs with entities with too far locations from each other in representative space.

In step 640, data management system 100 may analyze representative entity pairs to identify candidate pairs (e.g., candidate pairs 211 of FIG. 2A). Data management system 100 may identify representative entity pairs that are the most similar entity pairs to include in candidate pairs. Data management system 100 may use contrastive learning pipeline 200 to determine the most similar entity pairs. Contrastive learning pipeline 200 may review the closeness between data representations (e.g., data representations 221 of FIG. 2A) of entities to determine closeness in a representative space. In some embodiments, data management system 100 may perform a nearest neighbor search to identify the most similar entities to include in candidate pairs 211.

Data management system 100 may determine the similarity between two entities in an entity pair by determining the distance between locations of data representations of entities in representation space. Data management system 100 may determine location closeness between two entities by determining a cosine angle between vector representations of entities in an entity pair. Data management system 100 may use the cosine function to determine the angle and similarity between entities in an entity pair. Data management system 100 may consider entities to be most similar when the angle determined by cosine is larger than a threshold value.

In step 650, data management system 100 may determine matched entity pairs (e.g., matched pairs 213 of FIG. 2A) of candidate pairs (e.g., candidate pairs 211 of FIG. 2A). Data management system 100 may use a machine learning model in matcher 120 to identify matched pairs trained using candidate pairs.

Data management system 100 may train first machine learning model included in matcher 120 to identify matched pairs (e.g., matched pairs 213 of FIG. 2A). Data management system 100 may pre-train first machine learning model using a subset of candidate pairs (e.g., candidate pairs 211 of FIG. 2A). Data management system 100 may apply labels, for example, pseudo labels using pseudo labeler 222 (as shown in FIG. 2A). In some embodiments, data management system 100 may apply labels to a subset of entity pairs of representative entity pairs (e.g., data representations 221 of FIG. 2A). Data subset of the set of representative entity pairs with a high confidence value.

Data management system 100 may apply positive and negative labels to entity pairs based on whether the entities in an entity pair are close and similar or dissimilar. Data management system 100 may determine positive and negative values between similar and dissimilar entities based on a similar function, for example, cosine, and use the values to determine positive and negative labels. Data management system 100 may apply a positive value label to a first entity pair with entities closer to each other when the positive value is above a threshold positive value. Similarly, data management system 100 may apply a negative value label to a second entity pair with entities farther from each other when the negative value is lower than a threshold negative value.

In step 660, data management system 100 may utilize matched pairs (e.g., matched pairs 213 of FIG. 2A) to perform a data management task. A user (e.g., user 170 of FIG. 1) may provide a request for a data management task sent via network 160 to apply to the matched entities. For example, a data integration task may be performed by data management system 100 combining matching entities can be performed on matching entities. In FIG. 3B, entities 331 and 341 are a match based on matching titles, and the data integration task will result in values in model and price to be used together with the title field value of entities 331 and 341.

Data management system 100, upon completion of step 660, completes (step 699) executing method 600 on computing device 500.

Example embodiments are described above with reference to flowchart illustrations or block diagrams of methods, apparatus (systems), and computer program products. It will be understood that each block of the flowchart illustrations or block diagrams, and combinations of blocks in the flowchart illustrations or block diagrams, can be implemented by computer program product or instructions on a computer program product. These computer program instructions can be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions can also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart or block diagram block or blocks.

Any combination of one or more computer readable medium(s) can be utilized. The computer readable medium can be a non-transitory computer readable storage medium. In the context of this document, a computer readable storage medium can be any tangible medium that can contain or store a program for use by or in connection with an instruction execution system, apparatus, or device.

Program code embodied on a computer readable medium can be transmitted using any appropriate medium, including but not limited to wireless, wireline, optical fiber cable, RF, IR, etc., or any suitable combination of the foregoing.

Computer program code for carrying out operations, for example, embodiments can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer, and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). The computer program code can be compiled into object code that can be executed by a processor or can be partially compiled into intermediary object code or interpreted in an interpreter, just-in-time compiler, or a virtual machine environment intended for executing computer program code.

The flowchart and block diagrams in the figures illustrate examples of the architecture, functionality, and operation of possible implementations of systems, methods, and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment can be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A data management system comprising:
one or more memory devices storing processor executable instructions; and
one or more processors configured to execute the instructions to cause the data management system to perform operations, the operations comprising:
receiving at least two sets of data and a data management task request, wherein the at least two sets of data include a set of entities;
determining a location of the set of entities in a representative space, wherein the location in the representative space is determined based on a representative structure of the set of entities;
determining a set of corresponding representative entity pairs from the at least two sets of data, wherein entities of the set of corresponding representative entity pairs are determined to be closer in the representative space based on an angle between vector representations of the entities of the set of corresponding representative entity pairs;
analyzing the set of corresponding representative entity pairs to identify a set of candidate pairs, wherein the set of candidate pairs includes entity pairs of the corresponding representative entity pairs that are determined to be most similar entity pairs, wherein the most similar entity pairs are determined according to a closeness of location in the representative space of entities of the set of corresponding representative entity pairs;
determining matched entity pairs of the set of candidate pairs, wherein a first machine learning model is trained using the set of candidate pairs by applying labels; and
utilizing the matched entity pairs to perform the requested data management task.

2. The data management system of claim 1, wherein determining the location of the set of entities in the representative space further comprises:

pre-training a second model using a contrastive learning technique, wherein the contrastive learning technique includes a contrastive objective and takes as input the at least two sets of data; and determining the representative structure of the set of entities using the second model.

3. The data management system of claim 2, wherein the second model is a convolution neural network.

4. The data management system of claim 2, wherein pre-training the second model using a contrastive learning technique further comprises:

generating training data for the second model using an augmentation operator based on the requested data management task, wherein the augmentation operator generates variants of entities in the at least two sets of data;

training the second model to determine similarity or dissimilarity between an entity of the set of entities and a variant of the entity, wherein training the second model further comprises:

encoding the entity and the variant of the entity using an embedding model; and projecting the encoded entity and the encoded variant in a vector space.

5. The data management system of claim 1, wherein the entities of the corresponding representative entity pairs are determined to be closer in the representative space based on an angle between vector representations of the entities of the corresponding representative entity pairs when the angle is more than a threshold value.

6. The data management system of claim 1, wherein the set of candidate pairs is used to train the first machine learning model by applying labels to a subset of the set of corresponding representative entity pairs, wherein the subset of the set of corresponding representative entity pairs includes entity pairs with similarity between vector representations above a positive threshold value or below a negative threshold value.

7. The data management system of claim 6, wherein applying labels to the subset of the set of corresponding representative entity pairs further comprises:

applying a positive value label to a first entity pair with entities that are determined to be closer to each other, wherein entities in the first entity pair are similar to each other; and applying a negative value label to a second entity pair with entities that are determined to be farther from each other, wherein entities in the second entity are dissimilar from each other.

8. The data management system of claim 7, wherein applying the positive value label to the first entity pair further comprises:

varying an amount of negative value depending on an amount of distance between entities in the first entity pair.

9. The data management system of claim 7, wherein applying the negative value label to the second entity pair further comprises:

varying an amount of positive value depending on an amount of distance between entities in the second entity pair.

10. The data management system of claim 1 wherein a data management task request includes one of: data integration, data cleanup, or data discovery.

11. The data management system of claim 1, wherein determining matched entity pairs of the set of candidate pairs includes binary classification of at least one entity pair as matched or unmatched.

12. The data management system of claim 1, wherein determining matched entity pairs of the set of candidate pairs includes determining a level of match between entities of at least one entity pair.

13. The data management system of claim 1, wherein the candidate pairs are used to train the first machine learning model that includes a linear layer based on the requested data management task.

14. A method for performing data management tasks on entities utilizing a data management system, the method comprising:

receiving at least two sets of data and a data management task request, wherein the at least two sets of data include a set of entities;

determining a location of the set of entities in a representative space, wherein the location in the representative space is determined based on a representative structure of the set of entities;

determining, a set of corresponding representative entity pairs from the at least two sets of data, wherein entities in each of the set of corresponding representative entity pairs are determined to be closer in the representative space based on an angle between vector representations of the entities of the set of corresponding representative entity pairs;

analyzing the set of corresponding representative entity pairs to identify a set of candidate pairs, wherein the set of candidate pairs includes entity pairs of the corresponding representative entity pairs that are determined to be most similar entity pairs, wherein the most similar entity pairs are determined according to a closeness of location in the representative space of entities of the set of corresponding representative entity pairs;

determining matched entity pairs of the set of candidate pairs, wherein a first machine learning model is trained using the set of candidate pairs by applying labels; and utilizing the matched entity pairs to perform the requested data management task.

15. The method of claim 14, wherein determining the location of the set of entities in the representative space further comprises:

pre-training a second model using a contrastive learning technique, wherein the contrastive learning technique includes a contrastive objective and takes as input the at least two sets of data; and determining the representative structure of the set of entities using the second model.

16. The method of claim 14, wherein the entities of the corresponding representative entity pairs are determined to be closer in the representative space based on an angle between vector representations of the entities of the corresponding representative entity pairs when the angle is more than a threshold value.

17. The method of claim 14, wherein the set of candidate pairs is used to train the first machine learning model by applying labels to a subset of the set of corresponding representative entity pairs; wherein the subset of the set of corresponding representative entity pairs includes entity pairs with similarity between vector representations above a positive threshold value or below a negative threshold value.

18. The method of claim 17, wherein applying labels to the subset of the set of corresponding representative entity pairs further comprises:

applying a positive value label to a first entity pair with entities that are determined to be closer to each other, wherein entities in the first entity pair are similar to each other; and applying a negative value label to a second entity pair with entities that are determined to be farther from each other, wherein entities in the second entity pair are dissimilar from each other.

19. The method of claim 18, wherein applying the positive value label to the first entity pair further comprises:

varying an amount of negative value depending on amount of distance between entities in the first entity pair.

20. A non-transitory computer readable medium including instructions that are executable by one or more processors to cause a system to perform a method performing data management task on entities, the method comprising:

receiving at least two sets of data and a data management task request, wherein the at least two sets of data include a set of entities;

determining a location of the set of entities in a representative space, wherein the location in the representative space is determined based on a representative structure of the set of entities;

determining a set of corresponding representative entity pairs from the at least two sets of data, wherein entities of the set of corresponding representative entity pairs are determined to be closer in the representative space based on an angle between vector representations of the entities of the set of corresponding representative entity pairs;

analyzing the set of corresponding representative entity pairs to identify a set of candidate pairs, wherein the set of candidate pairs includes entity pairs of the corresponding representative entity pairs that are determined to be most similar entity pairs, wherein the most similar entity pairs are determined according to a closeness of location in the representative space of entities of the set of corresponding representative entity pairs;

determining matched entity pairs of the set of candidate pairs, wherein a first machine learning model is trained using the set of candidate pairs by applying labels; and utilizing the matched entity pairs to perform the requested data management task.

* * * * *